United States Patent
Li et al.

(10) Patent No.: US 12,401,548 B2
(45) Date of Patent: Aug. 26, 2025

(54) SOUNDING AND TRANSMISSION PRECODING MATRIX INDICATION DETERMINATION USING MACHINE LEARNING MODELS

(71) Applicant: QUALCOMM Incorporated, San Diego, CA (US)

(72) Inventors: Qiaoyu Li, Beijing (CN); Yu Zhang, San Diego, CA (US); Rui Hu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 18/548,859

(22) PCT Filed: May 13, 2021

(86) PCT No.: PCT/CN2021/093542
§ 371 (c)(1),
(2) Date: Sep. 1, 2023

(87) PCT Pub. No.: WO2022/236763
PCT Pub. Date: Nov. 17, 2022

(65) Prior Publication Data
US 2024/0163136 A1    May 16, 2024

(51) Int. Cl.
*H04L 25/02* (2006.01)
*H04B 7/06* (2006.01)

(52) U.S. Cl.
CPC ....... *H04L 25/0226* (2013.01); *H04B 7/0639* (2013.01); *H04L 25/0254* (2013.01)

(58) Field of Classification Search
CPC ............ H04L 25/0226; H04L 25/0254; H04B 7/0639; H04B 7/0619
(Continued)

(56) References Cited

U.S. PATENT DOCUMENTS

2019/0277957 A1* 9/2019 Chandrasekhar ....... G01S 5/017
2020/0336264 A1* 10/2020 Faxér ................... H04B 7/0617
(Continued)

FOREIGN PATENT DOCUMENTS

| WO | 2020077536 A1 | 4/2020 |
| WO | 2021081981 A1 | 5/2021 |

OTHER PUBLICATIONS

International Search Report and Written Opinion—PCT/CN2021/093542—ISA/EPO—Oct. 25, 2021.
(Continued)

*Primary Examiner* — Emmanuel Bayard
(74) *Attorney, Agent, or Firm* — Patterson+ Sheridan, L.L.P.

(57) ABSTRACT

Certain aspects of the present disclosure provide techniques for sounding and precoding uplink transmissions using one or more machine learning models. An example method generally includes generating a sounding reference signal (SRS) using an SRS deep neural network (DNN); transmitting, to a network entity, the generated SRS in one or more resource elements (REs); receiving, from the network entity, information identifying a precoding matrix to use for uplink transmissions on a shared channel; precoding uplink transmissions based on the identified precoding matrix; and transmitting, to the network entity, the precoded uplink transmissions on the shared channel.

20 Claims, 8 Drawing Sheets

(58) Field of Classification Search
USPC .......................................................... 375/260
See application file for complete search history.

(56) References Cited

U.S. PATENT DOCUMENTS

| | | | |
|---|---|---|---|
| 2021/0064996 A1 | 3/2021 | Wang et al. | |
| 2021/0120499 A1* | 4/2021 | Su .......................... | H04W 52/14 |
| 2021/0399773 A1* | 12/2021 | Huang .................. | H04B 17/364 |
| 2022/0338189 A1* | 10/2022 | Madadi .............. | H04B 17/3913 |

OTHER PUBLICATIONS

Vivo: "Study on AI/ML based Air Interface Enhancement in Rel-18", 3GPP TSG RAN Meeting #91e, RP-210321, 3rd Generation Partnership Project, Mobile Competence Centre, 650, Route Des Lucioles, F-06921 Sophia-Antipolis Cedex, France, vol. TSG RAN, No. Electronic Meeting, Mar. 16, 2021-Mar. 26, 2021, 13 Pages, Mar. 15, 2021, XP051985674, the whole document.

\* cited by examiner

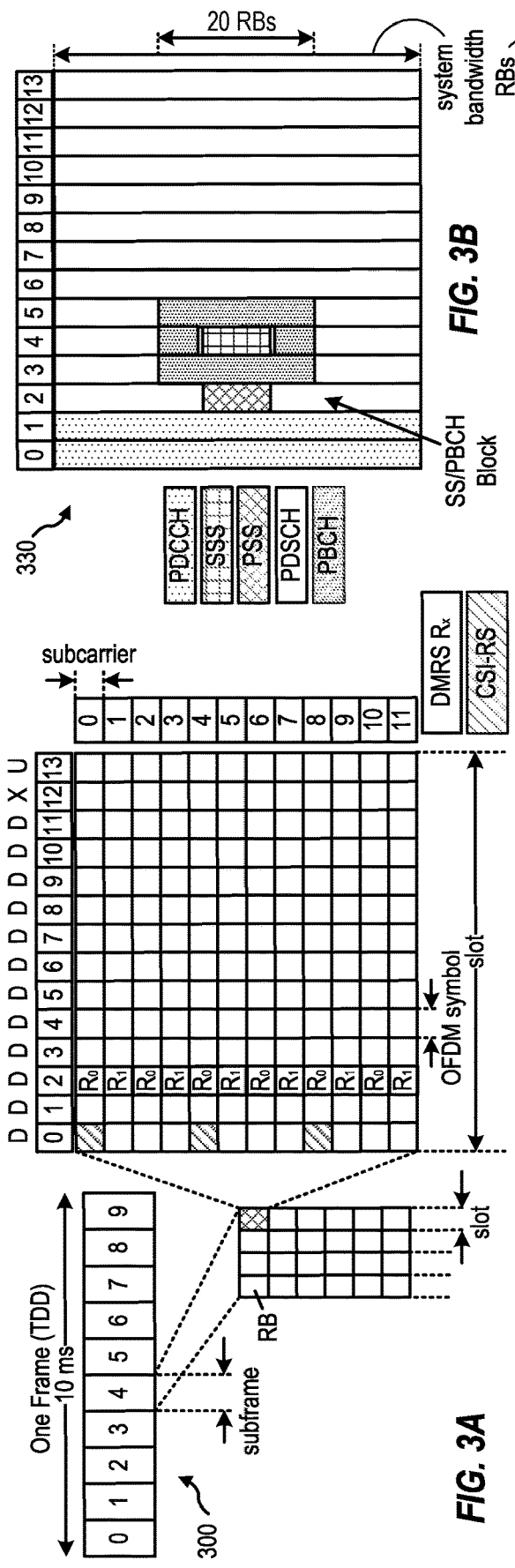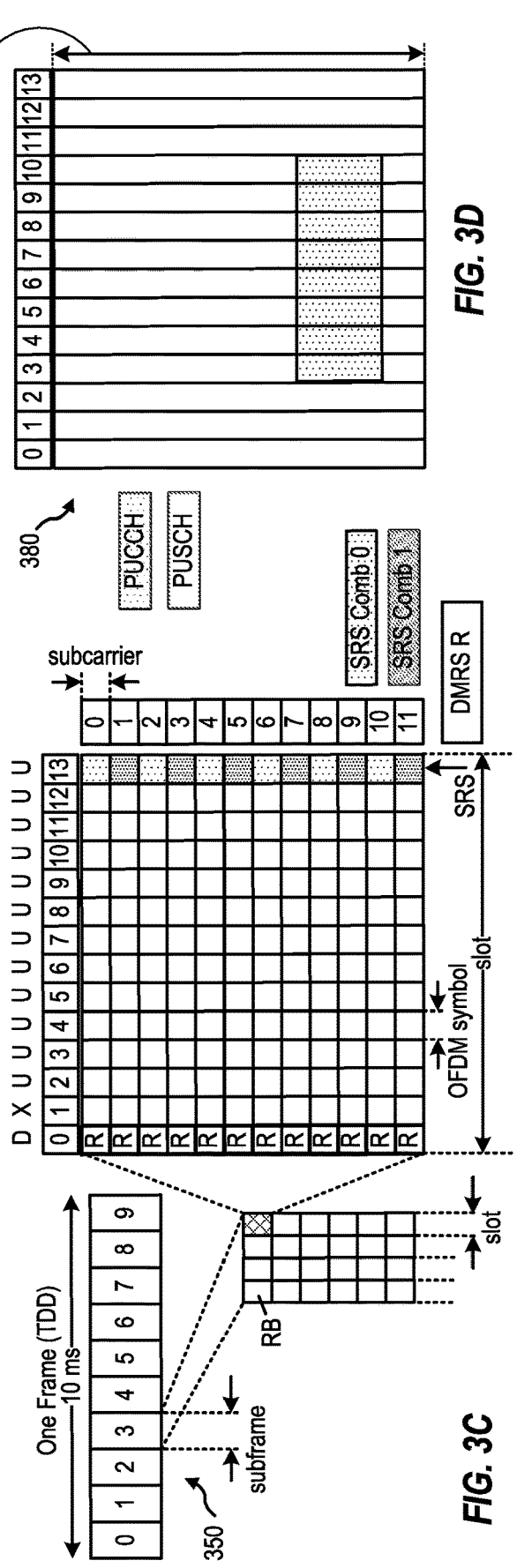
FIG. 3A
FIG. 3B
FIG. 3C
FIG. 3D

SOUNDING AND TRANSMISSION PRECODING MATRIX INDICATION DETERMINATION USING MACHINE LEARNING MODELS

CROSS-REFERENCE TO RELATED APPLICATION(S)

This application is a national stage application under 35 U.S.C. 371 of PCT/CN2021/093542, filed May 13, 2021, which is hereby expressly incorporated by reference herein in its entirety as if fully set forth below and for all applicable purposes.

INTRODUCTION

Aspects of the present disclosure relate to wireless communications, and more particularly, to techniques for sounding and transmission precoding matrix indication determination for uplink transmissions using machine learning models.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user equipment. The method generally includes generating a sounding reference signal (SRS) using an SRS deep neural network (DNN); transmitting, to a network entity, the generated SRS in one or more resource elements (REs); receiving, from the network entity, information identifying a precoding matrix to use for uplink transmissions on a shared channel; precoding uplink transmissions based on the identified precoding matrix; and transmitting, to the network entity, the precoded uplink transmissions on the shared channel.

One aspect provides a method for wireless communication by a network entity. The method generally includes receiving, from a user equipment (UE), a sounding reference signal generated by an SRS deep neural network (DNN); identifying a precoding matrix for the UE to use in uplink transmissions based on a precoding matrix DNN and the received SRS; transmitting, to the UE, information identifying the precoding matrix; and receiving, from the UE, uplink transmissions precoded using the identified precoding matrix.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for sounding and transmission precoding matrix indication determination for uplink transmissions using machine learning models.

Precoding schemes are generally used in beamforming transmissions to maximize a received signal strength of the transmission. Generally, the precoding used for transmissions may be determined based on various channel quality measurements. For example, precodings can be determined based on channel condition similarities assumed between an uplink channel and a downlink channel. However, because uplink channel conditions may be different from downlink channel conditions, the assumed channel condition similarities between the uplink and downlink channels may not actually exist. Thus, a precoding for an uplink transmission determined based on downlink channel conditions may not be an appropriate precoding for the uplink transmission.

Aspects of the present disclosure provide techniques for machine learning-based sounding and precoding for uplink transmissions. Generally, signaling used for uplink sounding by a network entity may be generated by a reference signal generation machine learning model, and the network entity can process the received signaling using a transmission precoding identification machine learning model trained to identify a transmission precoding matrix for the UE based on the received signaling. A precoding machine learning model may be used at the UE to interpret the received identification and identify the precoding to be used for uplink transmission to the network entity.

By using machine learning models for sounding and precoding for uplink transmissions, a UE may perform uplink transmissions using precodings that are more appropriate for the uplink channel conditions than a precoding assumed to be appropriate based on assumed channel condition similarities. By doing so, processing overhead in determining an appropriate precoding for an uplink transmission may be reduced. This may result in more efficient use of wireless communications resources, improved reliability for communications between the network entity and the UE, power savings due to a reduction in the amount of data transmitted and/or received in determining a precoding for uplink transmissions and in performing re-transmission of failed transmissions, and the like.

Introduction to Wireless Communication Networks

Figure 1:
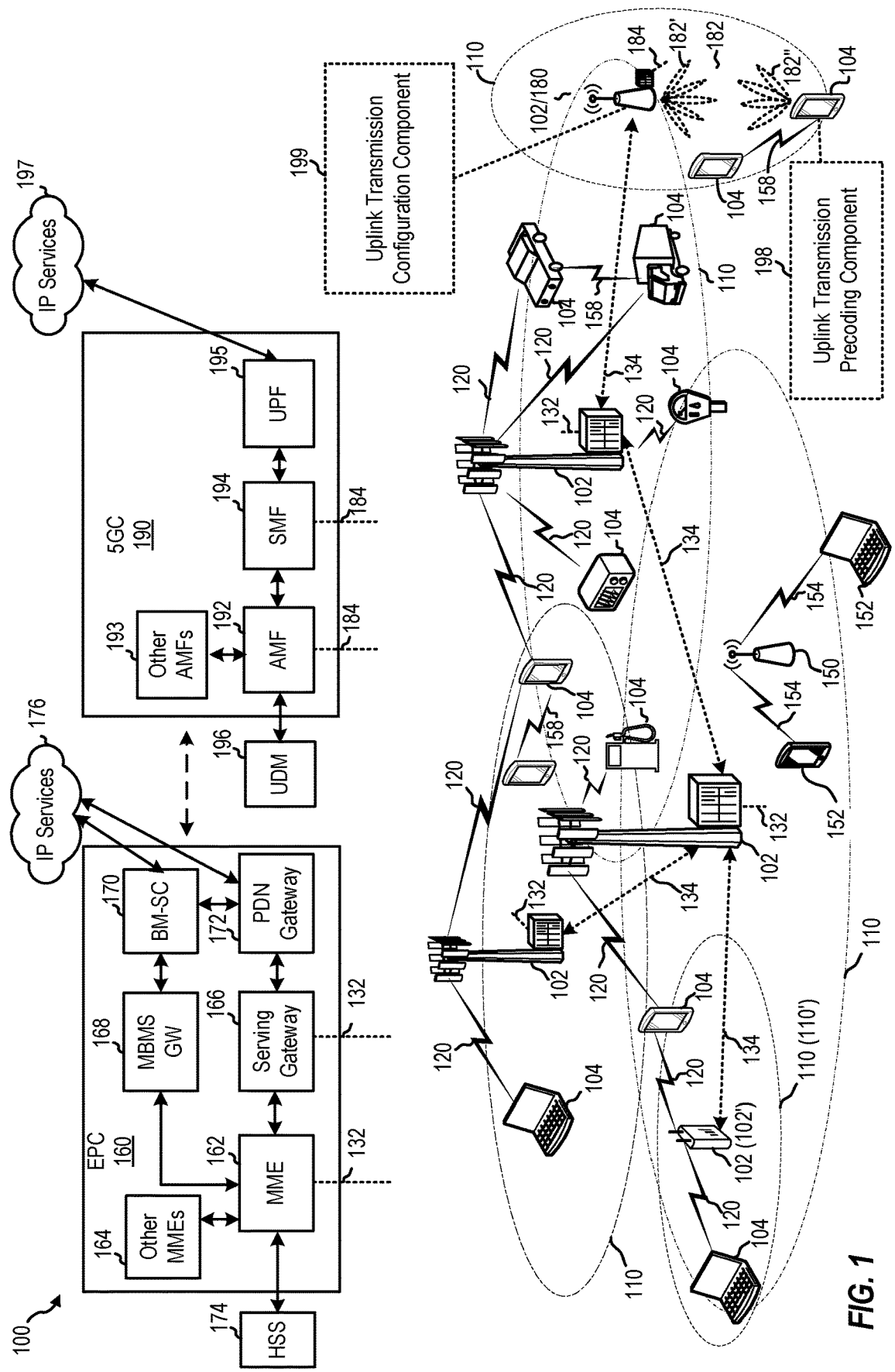
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multi cast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes uplink transmission configuration component 199, which may be configured to configure machine learning models for the UE to use in precoding uplink transmissions to the base station. Wireless network 100 further includes uplink transmission precoding component 198, which may be used configured to precode uplink transmissions using a precoding identified by machine learning models.

Figure 2:
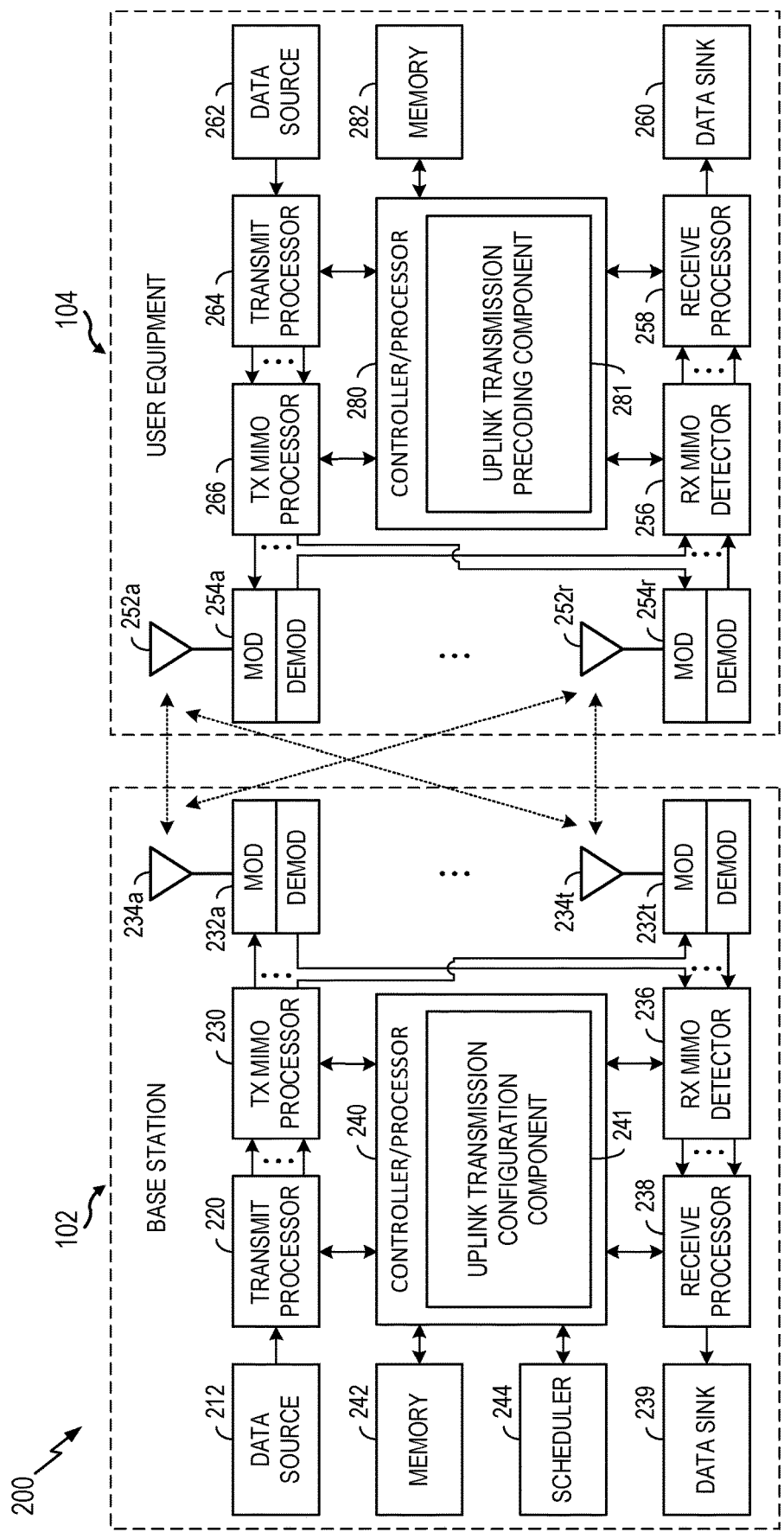
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes uplink transmission configuration component 241, which may be representative of uplink transmission configuration component 199 of FIG. 1. Notably, while depicted as an aspect of controller/processor 240, uplink transmission configuration component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes uplink transmission precoding component 281, which may be representative of uplink transmission precoding component 198 of FIG. 1. Notably, while depicted as an aspect of controller/processor 280, uplink transmission precoding component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Aspects Related to Sounding and Transmission Precoding Determination for Uplink Transmissions Using Machine Learning Models Precoding schemes in multiple user (MU) multiple-input-multiple-output (MIMO) (MU-MIMO) transmission schemes generally allow for transmissions to be beamformed so that a precoded signal transmitted by a transmitting wireless device is received at a receiving wireless device at a higher received power. Generally, the precoding used for transmissions may be determined based on various channel quality measurements. The precoding generally aids in beamforming a transmission such that strength of the transmission, when received by a receiving device, is maximized.

In one example, a precoding can be determined based on channel state reciprocity assumed between an uplink and a downlink channel. Channel state reciprocity generally refers to similarities in channel conditions between uplink and downlink channels. Generally, a network entity may perform channel state measurements on uplink channels (e.g., based on demodulation reference signals (DMRSs) or sounding reference signals (SRSs) to determine a precoder to use for a downlink channel. In using CSI measurements for uplink channels and assumed channel reciprocity for the downlink to determine a precoder to use for a downlink channel, the network entity can assume that the uplink channels and the downlink channels are symmetrical such that conditions measured on the uplink accurately reflect conditions on the downlink. These assumptions may be made, for example, for convenience, reducing latency entailed by waiting for downlink-specific measurements prior to determining a precoding to use for downlink transmissions, and the like. However, in some cases, the reciprocity assumed between the uplink and the downlink may not hold.

For example, in frequency-domain duplexed (FDD) systems where uplink transmissions are performed using different frequency bands from downlink transmissions, channel conditions on a frequency band used for uplink transmissions may be different than channel conditions on a frequency band for downlink transmissions. Thus, when uplink channel and downlink channel conditions are significantly different (e.g., due to interference on one, but not both, channels), the precoding selected for the downlink channel may be inaccurate. In one example, if the uplink channel has worse channel quality characteristics than the downlink channel and a downlink precoding is selected based on uplink channel measurements and assumed channel reciprocity, radio resources may not be fully used on the downlink (e.g., due to the allocation of additional resources for transmission bundling or other redundancies). In another example, if the uplink channel has better channel quality characteristics than the downlink channel and the precoding is selected based on uplink channel measurements and assumed channel reciprocity, downlink transmissions may fail because the precoding for these downlink transmissions may not be appropriate for the characteristics of the downlink channel, and additional resources may be used for retransmitting failed transmissions on the downlink channel.

Similarly, when uplink channel and downlink channel conditions are significantly different, the precoding selected for the uplink channel may also be inaccurate. In one example, if the uplink channel has worse channel quality characteristics than the downlink channel, and an uplink precoding is selected based on downlink channel measurements and assumed channel reciprocity, uplink transmissions may fail, and additional radio resources and battery power may be used for retransmitting failed transmissions on the uplink channel. If the uplink channel has better channel quality characteristics than the downlink channel, and the uplink precoding is selected based on downlink channel measurements and assumed channel reciprocity, radio resources may not be fully used on the uplink. Thus, in order to transmit a given number of information bits, a larger number of redundancy bits may be transmitted, which may also waste battery power, reduce overall bandwidth, and reduce availability of radio resources for other transmissions.

In another example, precoding matrix indicator-based channel state feedback can be used in MU-MIMO systems to determine precodings for a wireless transmission. In such a case, a network entity can transmit non-precoded CSI-RSs to a UE for measurement. The UE may determine, based on measurements of the non-precoded CSI-RSs, a precoding to use for an uplink transmission to the network entity. Channel state feedback, such as a precoding matrix indicator (PMI), may be precoded using the determined precoding and transmitted to the network entity, and the precoded channel state feedback and non-precoded CSI-RSs may be used to determine a modulation and coding scheme (MCS) for subsequent downlink transmissions. However, multiple rounds of the network entity transmitting non-precoded CSI-RSs to a UE and the UE providing precoded channel state feedback may be needed in order to determine a proper MCS. Thus, a time overhead may be imposed on the determination of a precoding for use in a transmission. Further, channel state feedback may become outdated over time, and thus, the determined MCS may be based on outdated feedback that is no longer applicable for the channel. While this may not be a significant problem in situations where channel conditions remain relatively consistent, this may decrease the applicability of the determined MCS in situations where channel conditions rapidly change (e.g. when the UE is mobility, or when radio conditions are changing around the UE due to weather-induced radio propagation changes, interference introduced from other devices, or the like).

In still another example, explicit CSI feedback may be used to determine a precoding for a wireless transmission. In this case, a network entity can transmit CSI-RS s for a UE to measure, and the UE can measure CSI based on the CSI-RSs and report the measured CSI to the network entity for use in determining a precoding. A large amount of data may be transmitted in order to provide a network entity a good representation of the CSI, which may increase the overhead entailed in sounding and precoding determination.

To improve the process of determining precodings to use for downlink transmissions between a transmitting device and a receiving device (e.g., between a network entity and a UE), various machine learning-based techniques can be used.

For example, in a deep neural network (DNN)-based downlink precoding scheme, DNNs may be trained based on information for a single UE for common channel state feedback. These DNNs may include, for example, a CSI-RS DNN deployed at a network entity and trained to generate a CSI-RS pattern for CSI-RSs to be transmitted to a UE for measurement, a channel state feedback DNN deployed at the UE to process the received CSI-RS pattern and to generate a feedback report, and a single user (SU) precoding DNN deployed at the network entity and trained to determine a single user precoding based on the received feedback. Each of the first, second, and third DNNs may be trained based on a loss function that maximizes a transmission and/or reception metric, such as a signal-plus-interference-to-noise ratio (SINR).

In some cases, each UE with which the network entity communicates can use an instance of the trained CSI-RS DNN and channel state feedback DNN, and a multi-user precoding DNN can be trained at the network side for use in determining a precoding to use for downlink transmissions. The multi-user precoding DNN may be trained, for example, based on a loss function that maximizes sum rate, or the number of bits transmitted per unit of energy consumed by the downlink transmission.

The DNN-based downlink precoding schemes may allow for reductions in payload size relative to explicit channel state feedback. For example, for a given number of information bits to be included in a downlink transmission, the total number of bits transmitted may be lower using DNN-based downlink precoding schemes as opposed to downlink transmissions using precodings selected using explicit channel state feedback. Additionally, UE complexity may be reduced due to the replacement of channel estimation with a neural network-based solution, and the network entity may replace the complexity of multi-user precoding calculations with less computationally expensive determinations based on the output of the multi-user precoding deep neural network. However, while DNN-based downlink precoding schemes may provide for improvements in determining precodings used for downlink transmissions, these DNN-based downlink precoding schemes may not provide these improvements for uplink transmissions.

Aspects of the present disclosure provide techniques for machine learning-based sounding and precoding for uplink transmissions. The techniques may be used, for example, to increase the accuracy or applicability of precodings used for uplink transmissions and to reduce processing overhead in determining an appropriate precoding for an uplink transmission, and may thus result in more efficient use of wireless communications resources, improved reliability for communications between the network entity and the UE, power savings due to a reduction in the amount of data transmitted and/or received in determining a precoding for uplink transmissions and in performing re-transmission of failed transmissions, and the like. Further, aspects of the present disclosure account for the variability of UE antenna configurations. A unified transmission precoding matrix indicator (TPMI) codebook for a universe of unique UEs need not be defined in order to allow for UE-specific sounding and uplink precoding techniques.

Figure 4:
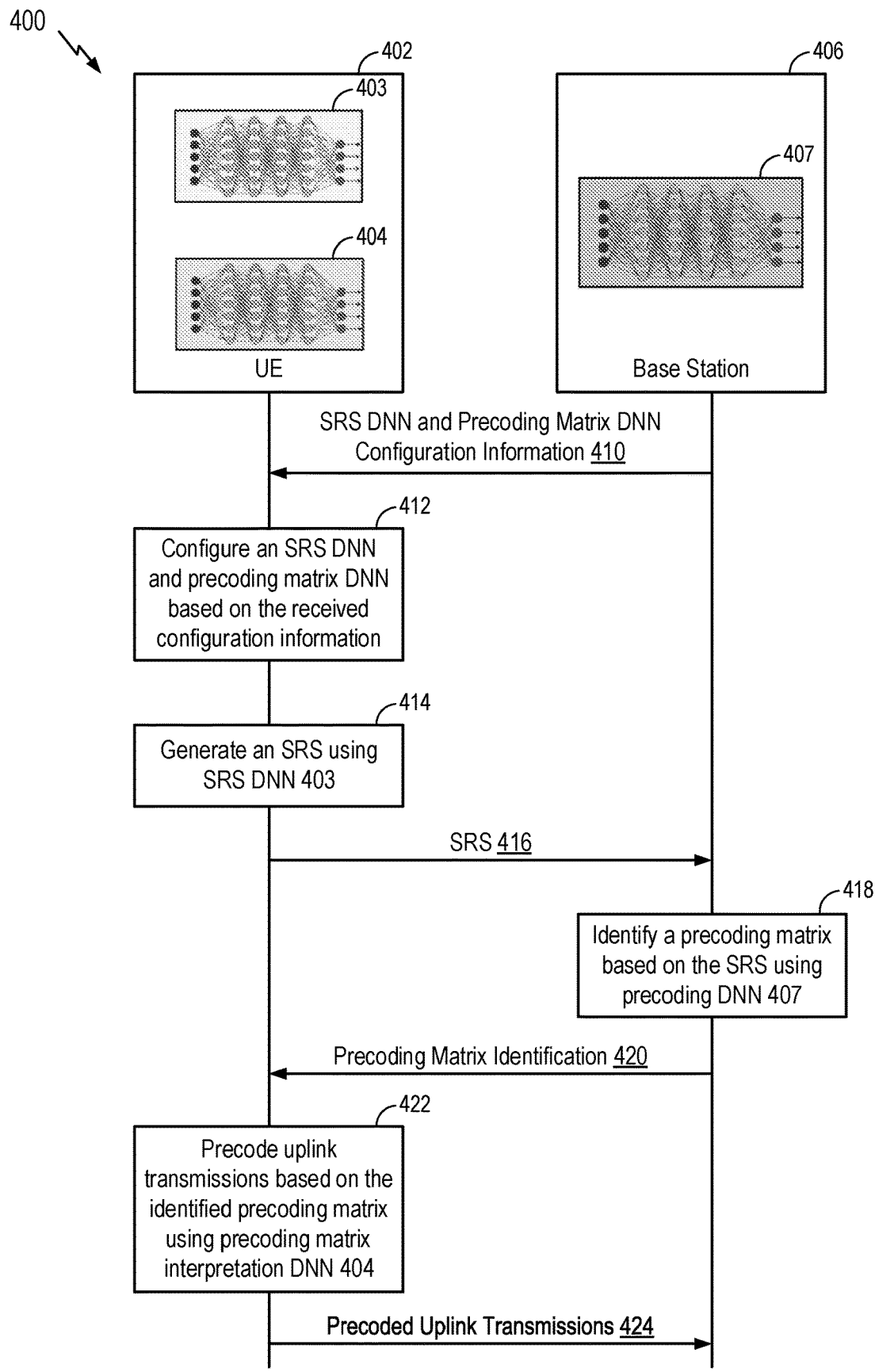
FIG. 4 illustrates a call flow diagram of messages that may be exchanged between a UE and a network entity (such as a gNodeB) to precode an uplink transmission based on SRSs and precoding matrices generated or otherwise identified by one or more machine learning models.

FIG. 4 illustrates a call flow diagram of messages that may be exchanged between a UE 402 and a base station 406 to precode an uplink transmission based on SRSs and precoding matrices generated or otherwise identified by one or more machine learning models. An SRS DNN 403 and a precoding matrix interpretation DNN 404 may be deployed on UE 402, and a precoding matrix DNN 407 may be deployed on base station 406.

As illustrated, base station 406 can transmit configuration information 410 to UE 402. Configuration information 410 may include, for example, configuration information for the SRS DNN 403 and the precoding matrix DNN 404. Generally, the configuration information may include values of weight and/or bias parameters for these DNNs, which may be defined by the base station 406 or statically defined (e.g., in a wireless communication standard).

At block 412, the UE 402 configures the SRS DNN 403 and the precoding matrix DNN 404 based on the received configuration information.

Generally, to configure the SRS DNN 403 and the precoding matrix DNN 404, the UE can set values for one or more parameters of these DNNs to the values of the associated parameters in the received configuration information. In some aspects, where the received configuration information includes indices of sets of parameters in a lookup table, the UE can configure the SRS DNN 403 and/or precoding matrix DNN 404 by specifying the index in the parameters of the SRS DNN 403 and/or precoding matrix DNN 404 or by retrieving the weight and/or bias parameters from the lookup table and configuring the SRS DNN 403 and/or precoding matrix DNN 404 with the retrieved weight and/or bias parameters.

It should be understood that, while the configuration information is illustrated as being communicated from base station 406 to UE 402, the SRS DNN and the precoding matrix DNN may be configured a priori at the UE 402 and need not be configured by the base station 406.

At block 414, the UE 402 generates an SRS using the SRS DNN. The inputs into the SRS DNN 403 may be indicated by the network entity (e.g., in configuration information received from the network entity) or may be defined a priori (e.g., in a wireless communication standard). The inputs may include, for example, an indication of a base sequence, subframe configuration information, bandwidth information, cyclic shift information, and/or other data that can be used as a basis for generating the SRS. The weights and biases of the SRS DNN 403 may also be indicated by the network entity in the configuration information received from the network entity or defined a priori, as discussed above. The output of the SRS DNN 403 may be a generated SRS, and the generated SRS may be transmitted to the network entity for use in identifying a precoding matrix for the UE 402 to use for uplink transmissions on a shared channel.

At block 418, the base station 406 identifies a precoding matrix based on the SRS. Generally, to identify the precoding matrix, the base station 406 can use the SRS 416 as input into the precoding matrix DNN 407. The precoding matrix DNN 407 generally uses at least the received SRS as input to identify a precoding matrix for the UE 402 to use for precoding a subsequent uplink transmission to the network entity. The weights and biases of the precoding matrix DNN 407 may be, for example, defined a priori (e.g., in a wireless communication standard) or provided to the network entity from a core network management entity. The precoding matrix DNN 407 can generate a transmission precoding matrix indicator (TPMI) or other information identifying the properties of a precoding matrix that the UE 402 is to use for precoding the uplink transmission, and the output of the precoding matrix DNN 407 may be transmitted to the UE 402 for use in precoding the uplink transmission.

At block 422, the UE 402 precodes uplink transmissions based on the identified precoding matrix. To precode an uplink transmission, the UE 402 can use the received precoding matrix identification 420 as input into a precoding matrix interpretation DNN 404, which may be trained to identify a precoding to apply to an uplink transmission based on a received precoding matrix identification. The UE 402 can then precode the uplink transmission and transmit the precoded uplink transmission 424 to the base station 406. The precoding matrix interpretation DNN 404 generally uses at least the received information identifying the precoding matrix to apply a precoding to an uplink transmission. In some aspects, the precoding matrix interpretation Precoding matrix interpretation DNN 404 may be trained to map the received information identifying the precoding matrix (which may include, for example a TPMI generated by the precoding matrix DNN 407) to a precoding to apply to the uplink transmission. The weights and biases of the precoding matrix interpretation DNN 404 may be configured by a network entity or defined a priori (e.g., in a wireless communication standard).

Figure 5:
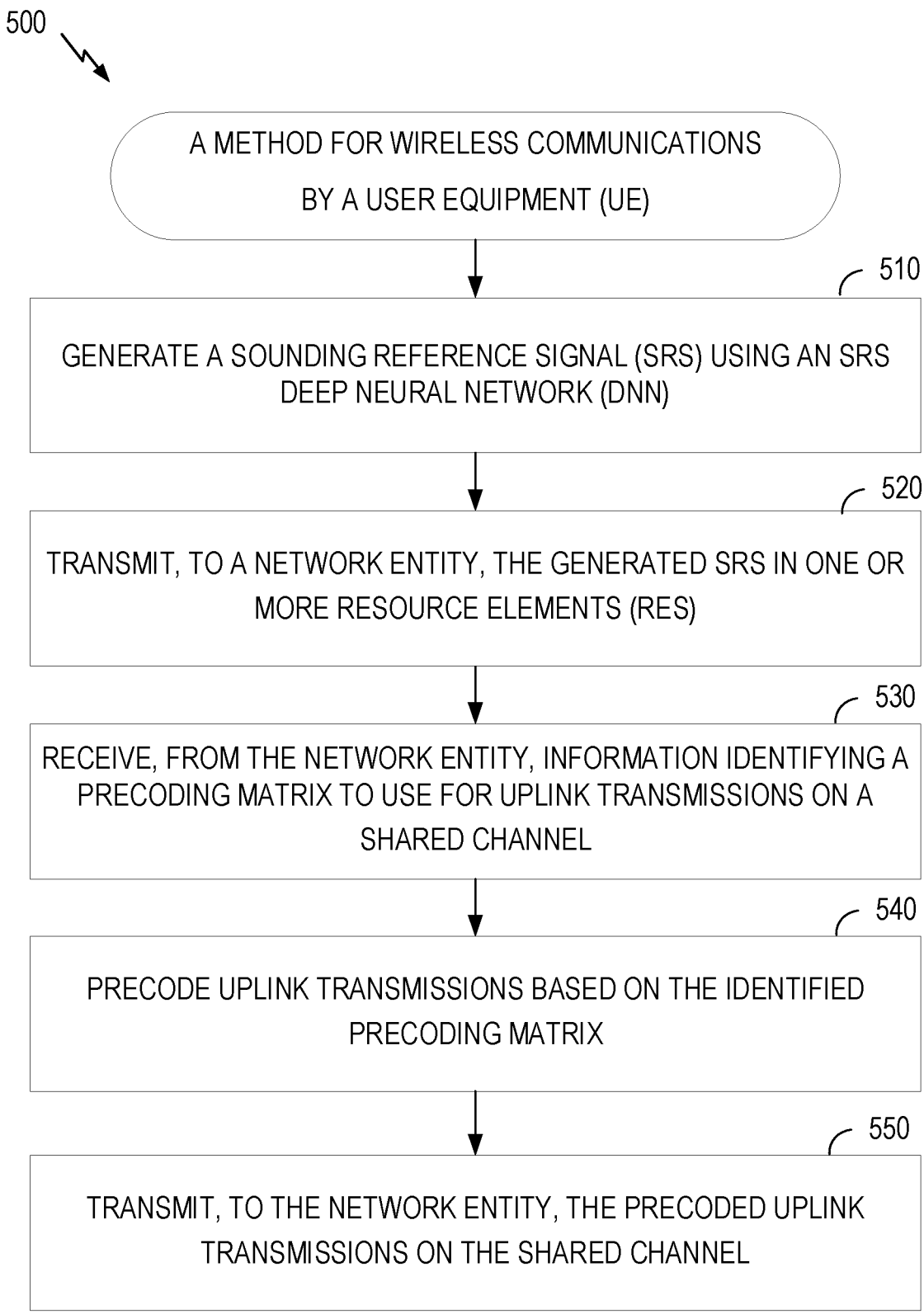
FIG. 5 illustrates example operations for wireless communication by a user equipment for sounding and performing uplink transmissions using machine learning models, in accordance with certain aspects of the present disclosure.

FIG. 5 illustrates example operations 500 for wireless communications by a user equipment (UE). Operations 500 may be performed, for example, by uplink transmission precoding component 198 or uplink transmission precoding component 281 illustrated in FIG. 1 or 2.

As illustrated, operations 500 begin at block 510, where the UE generates a sounding reference signal (SRS) using an SRS deep neural network (DNN) (e.g., SRS DNN 403 illustrated in FIG. 4). In some aspects, the weights and biases for the SRS DNN may include a set of weights and biases defined apriori (e.g., in a wireless communication standard). In some aspects, the weights and biases for the SRS DNN may be configured by the network entity. In such a case, the UE may receive, from the network entity, information identifying these parameters. The information may include explicitly communicated values for one or more bias and/or weight parameters of the SRS DNN. In some cases, the parameters may be, for example, bias and/or weight parameters selected from sets of parameters in a lookup table, where each set of parameters is associated with a unique index in the lookup table. The configuration information communicated to the UE may include an index in the lookup table, and using the index, the UE can identify the set of bias and/or weight parameters to use for the SRS DNN.

At block 520, the UE transmits, to a network entity, the generated SRS in one or more resource elements (REs).

In some aspects, the one or more REs, may be statically defined REs. For example, the statically defined REs may be defined in a wireless communication standard or otherwise defined a priori. In some aspects, the UE can receive configuration information from the network entity identifying the one or more REs.

In some aspects, the UE can apply a code division multiplexing (CDM) cover code to the generated SRS. After applying to the CDM cover code to the generated SRS, the generated SRS may be transmitted to the network entity.

At block 530, the UE receives, from the network entity, information identifying a precoding matrix to use for uplink transmissions on a shared channel. For example, the information identifying the precoding matrix may include a precoding matrix identifier (PMI), a transmission precoding matrix identifier (TPMI), or the like.

At block 540, the UE precodes uplink transmissions based on the identified precoding matrix.

At block 550, the UE transmits, to the network entity, the precoded uplink transmissions on the shared channel.

In some aspects, the UE can receive, from the network entity, a transmitted precoding matrix indicator (TPMI), based on the generated SRS, for use in precoding the uplink transmissions. For example, the UE can precode the uplink transmissions by applying a precoding to the uplink transmissions based, at least in part, on an output from one or more precoding matrix interpretation DNNs (e.g., precoding matrix interpretation DNN 404 illustrated in FIG. 4). In such examples, the TPMI received from the network entity may be used as an input into the precoding DNNs. In some aspects, the parameters of the one or more precoding DNNs may be defined in a wireless communication standard or otherwise statically defined a priori. In some aspects, the parameters of the one or more precoding DNNs may be configured via configuration information received from the network entity.

In some aspects, the UE can precode the uplink transmissions by applying a precoding based on an association between the received TPMI and a precoding to apply to the uplink transmissions. In some aspects, the association between the received TPMI and a precoding to apply to the uplink transmissions may be statically defined (e.g., in a wireless communication standard) or otherwise defined a priori. The association between the received TPMI and the precoding to apply to the uplink transmissions may be identified in configuration information received from the network entity. The mapping may be determined by one or more precoding matrix interpretation DNNs, which may be configured to identify a precoding to apply to the uplink transmission based on a probability distribution over a universe of precodings. For example, the one or more precoding matrix interpretation DNNs may use a softmax layer over a universe of precodings to generate a probability distribution over the universe of precodings. The precoding associated with a highest probability in the probability distribution may be selected for use in precoding the uplink transmissions.

Figure 6:
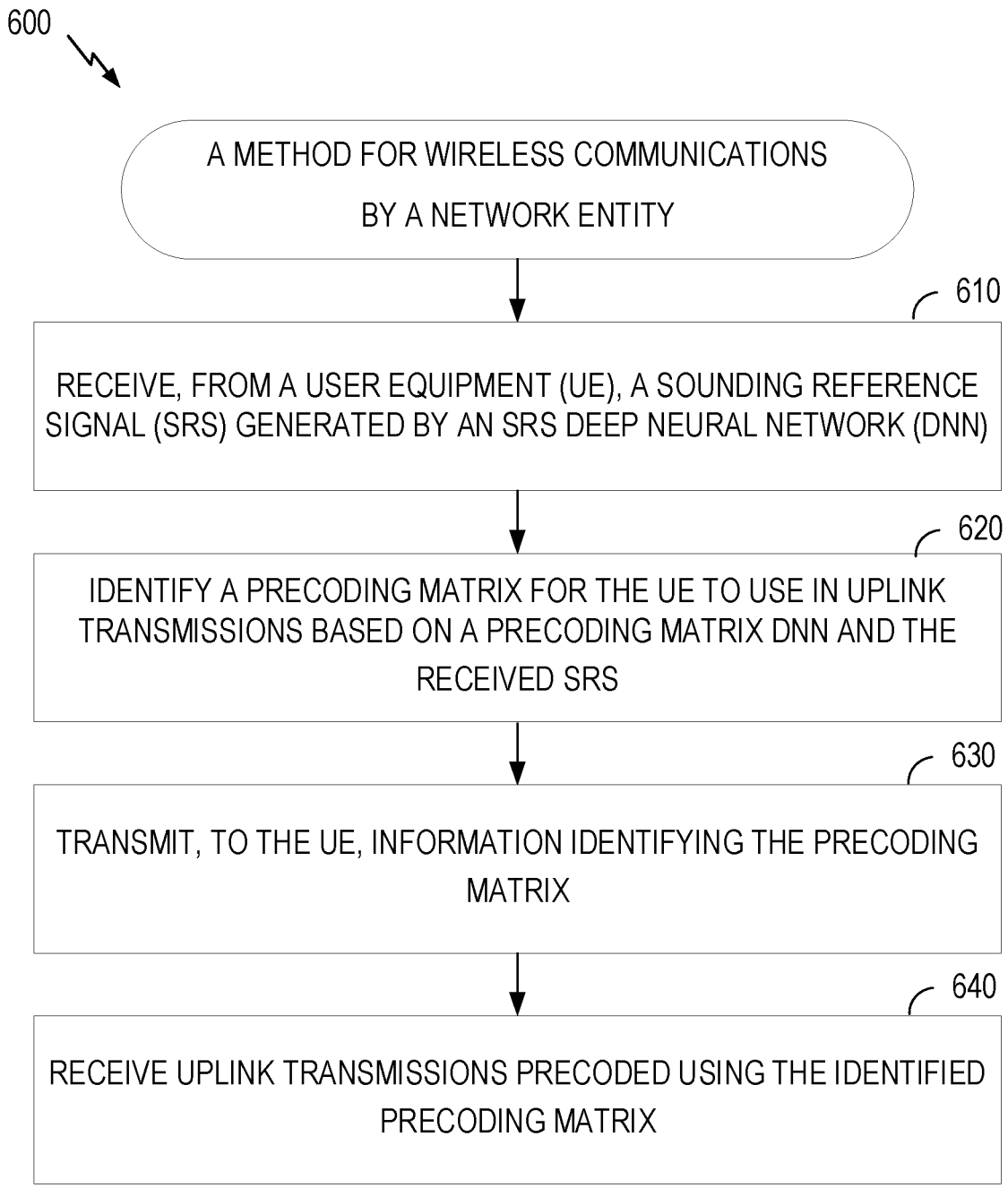
FIG. 6 illustrates example operations for wireless communication by a network entity (such as a gNodeB) for configuring a user equipment (UE) to perform uplink transmissions using machine learning models, in accordance with certain aspects of the present disclosure.

FIG. 6 illustrates example operations 600 that may be performed by a network entity (e.g., a gNodeB) to receive precoded uplink transmissions from a UE based on precoding matrix information determined based on one or more machine learning models, according to aspects of the present disclosure. Operations 600 may be performed, for example, by uplink transmission configuration component 199 or uplink transmission configuration component 241 illustrated in FIG. 1 or 2 and may be complementary to operations 500 discussed above.

Operations 600, as illustrated, begin at block 610, where the network entity receives, from a UE, a sounding reference signal. As discussed, the sounding reference signal may be generated by an SRS DNN, the parameters of which may be indicated to the UE by the network entity or may be statically defined (e.g., in a wireless communication standard).

At block 620, the network entity can identify a precoding matrix for the UE to use in uplink transmissions based on a precoding matrix DNN (e.g., precoding matrix DNN 407 illustrated in FIG. 4) and the received SRS. Generally, the precoding matrix DNN may be trained to learn relationships between a received SRS (e.g., the contents of the received SRS, measurements performed based on receiving the SRS, etc.) and a transmission precoding matrix that may result in receipt of uplink transmissions from the UE with a highest signal strength. In some aspects, the information identifying the precoding matrix may include one or more parameters that a precoding DNN can use to identify the precoding to be used for uplink transmissions to the network entity and need not, for example, explicitly identify the precoding.

At block 630, the network entity transmits, to the UE, information identifying the precoding matrix.

At block 640, the network entity receives uplink transmissions precoded using the identified precoding matrix.

Example Wireless Communication Devices

Figure 7:
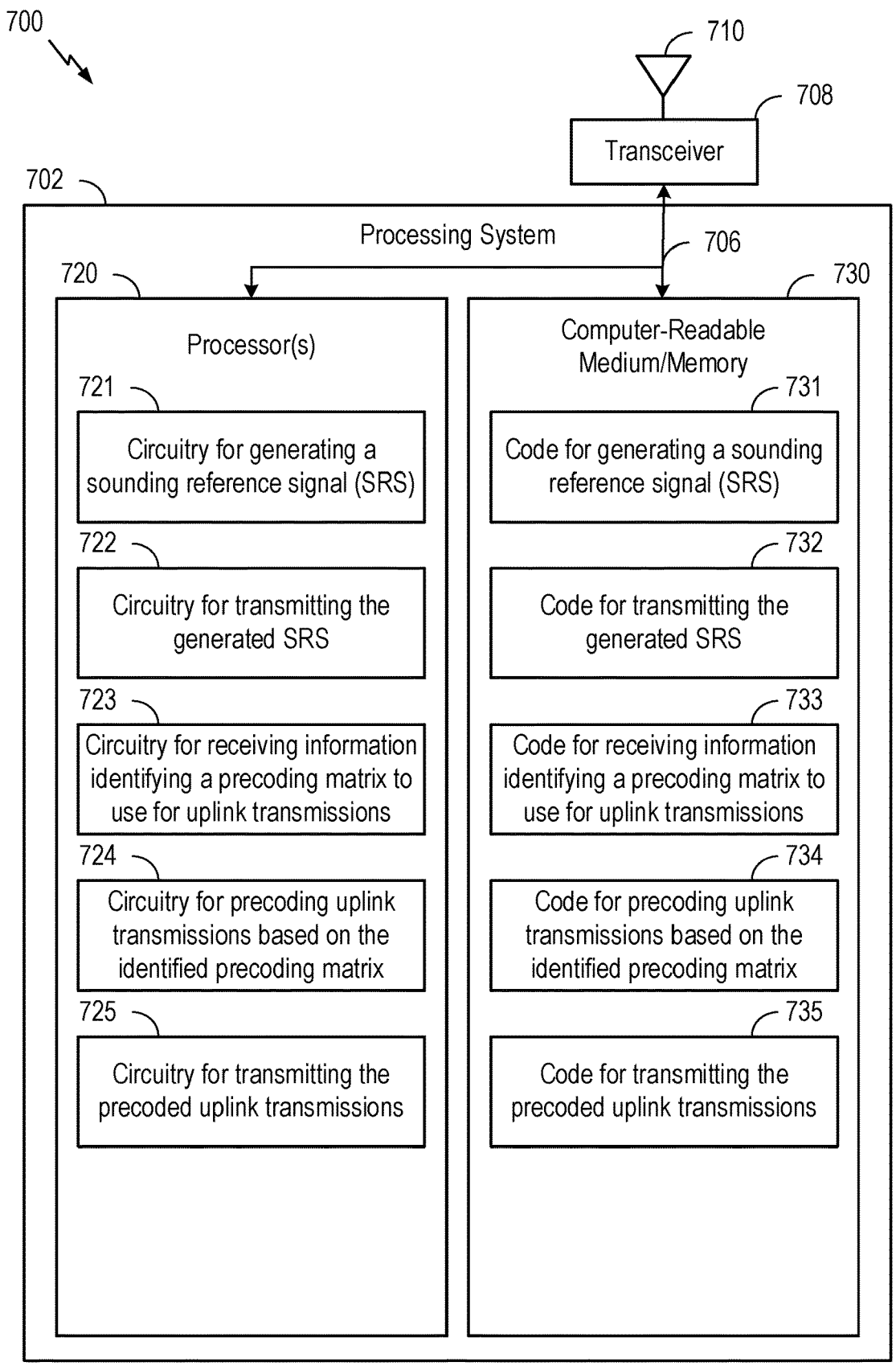
FIG. 7 depicts aspects of an example communications device

FIG. 7 depicts an example communications device 700 that includes various components operable, configured, or adapted to perform operations for the techniques disclosed herein, such as the operations depicted and described with respect to FIG. 5. In some examples, communication device 700 may be a user equipment 104 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 720 via a bus 706. In certain aspects, computer-readable medium/memory 720 is configured to store instructions (e.g., computer-executable code) that when executed by the one or more processors 720, cause the one or more processors 720 to perform the operations illustrated in FIG. 5, or other operations for performing the various techniques discussed herein to precode uplink transmissions using a precoding identified by machine learning models.

In the depicted example, computer-readable medium/memory 730 stores code 731 for generating a sounding reference signal (SRS), code 732 for transmitting the generated SRS, code 733 for receiving information identifying a precoding matrix to use for uplink transmissions, code 734 for precoding uplink transmissions based on the identified precoding matrix, and code 735 for transmitting the precoded uplink transmissions.

In the depicted example, the one or more processors 720 include circuitry configured to implement the code stored in the computer-readable medium/memory 720, including circuitry 721 for generating a sounding reference signal (SRS), circuitry 722 for transmitting the generated SRS, circuitry 723 for receiving information identifying a precoding matrix to use for uplink transmissions, circuitry 724 for precoding uplink transmissions based on the identified precoding matrix, circuitry 725 for transmitting the precoded uplink transmissions.

Various components of communications device 700 may provide means for performing the methods described herein, including with respect to FIG. 5.

In some examples, means for transmitting or sending (or means for outputting for transmission) may include the transceivers 254 and/or antenna(s) 252 of the user equipment 104 illustrated in FIG. 2 and/or transceiver 708 and antenna 710 of the communication device 700 in FIG. 7.

In some examples, means for receiving (or means for obtaining) may include the transceivers 254 and/or antenna(s) 252 of the user equipment 104 illustrated in FIG. 2 and/or transceiver 708 and antenna 710 of the communication device 700 in FIG. 7.

In some examples, means for generating a sounding reference signal and means for precoding uplink transmissions may include various processing system components, such as: the one or more processors 720 in FIG. 7, or aspects of the user equipment 104 depicted in FIG. 2, including receive processor 258, transmit processor 264, TX MIMO processor 266, and/or controller/processor 280 (including uplink transmission precoding component 281).

Notably, FIG. 7 is just use example, and many other examples and configurations of communication device 700 are possible.

Figure 8:
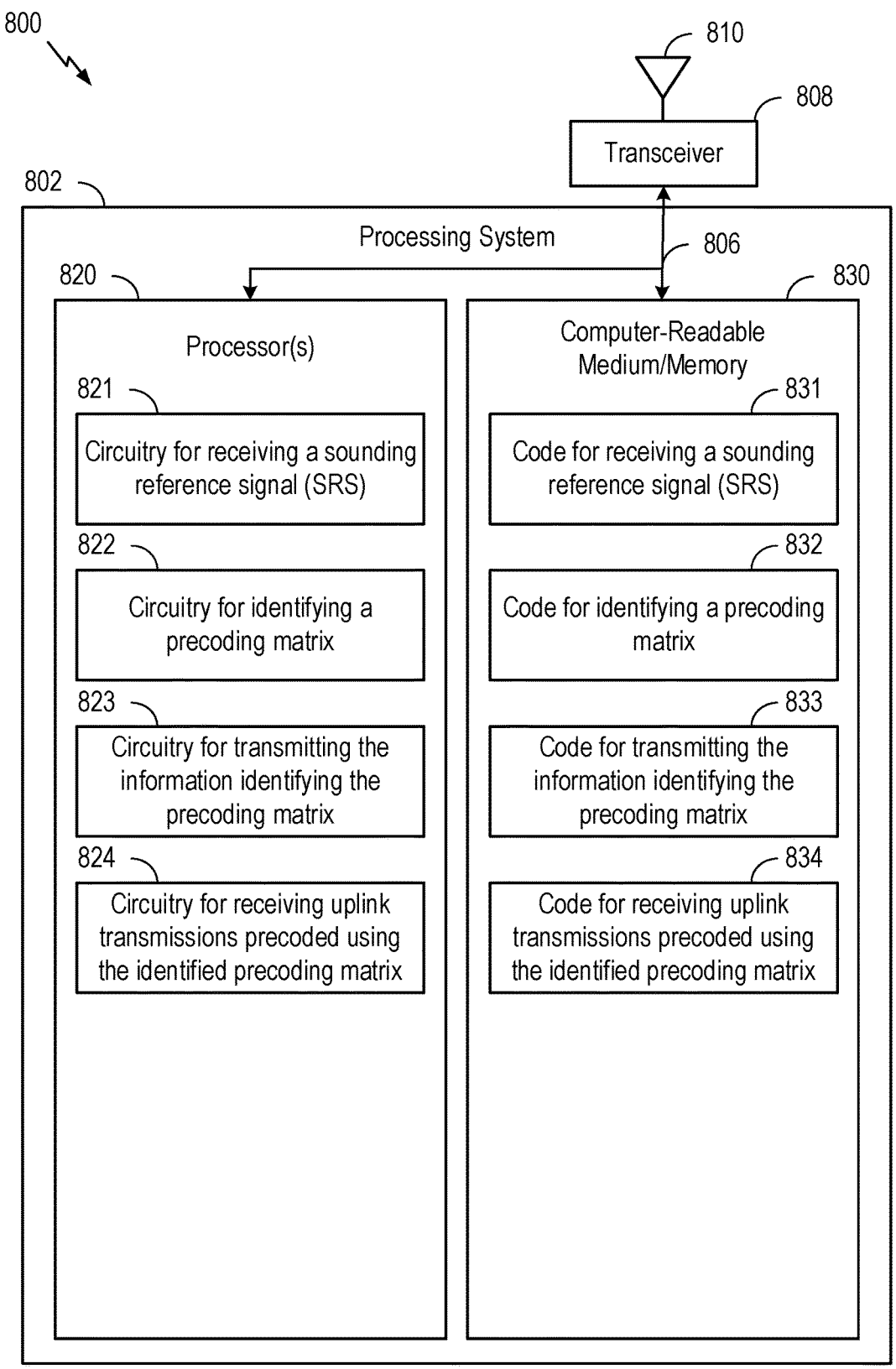
FIG. 8 depicts aspects of an example communications device.

FIG. 8 depicts an example communications device 800 that includes various components operable, configured, or adapted to perform operations for the techniques disclosed herein, such as the operations depicted and described with respect to FIG. 6. In some examples, communication device 800 may be a base station 102 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 820 via a bus 806. In certain aspects, computer-readable medium/memory 820 is configured to store instructions (e.g., computer-executable code) that when executed by the one or more processors 820, cause the one or more processors 820 to perform the operations illustrated in FIG. 6, or other operations for performing the various techniques discussed herein to configure machine learning models for the UE to use in precoding uplink transmissions to the base station.

In the depicted example, computer-readable medium/memory 830 stores code 831 for receiving a sounding reference signal, code 832 for identifying a precoding matrix, code 833 for transmitting the information identifying the precoding matrix, and code 834 for receiving uplink transmissions precoded using the identified precoding matrix.

In the depicted example, the one or more processors 820 include circuitry configured to implement the code stored in the computer-readable medium/memory 820, including circuitry 821 for receiving a sounding reference signal, circuitry 822 for identifying a precoding matrix, circuitry 823 for transmitting the information identifying the precoding matrix, and circuitry 824 for receiving uplink transmissions precoded using the identified precoding matrix.

Various components of communications device 800 may provide means for performing the methods described herein, including with respect to FIG. 6.

In some examples, means for transmitting or sending (or means for outputting for transmission) may include the transceivers 232 and/or antenna(s) 234 of the base station 102 illustrated in FIG. 2 and/or transceiver 808 and antenna 810 of the communication device 800 in FIG. 8.

In some examples, means for receiving (or means for obtaining) may include the transceivers 232 and/or antenna(s) 234 of the base station illustrated in FIG. 2 and/or transceiver 808 and antenna 810 of the communication device 800 in FIG. 8.

In some examples, means for identifying a precoding matrix may include various processing system components, such as: the one or more processors 820 in FIG. 8, or aspects of the base station 102 depicted in FIG. 2, including receive processor 238, transmit processor 220, TX MIMO processor 230, and/or controller/processor 240 (including uplink transmission configuration component 241).

Notably, FIG. 8 is just use example, and many other examples and configurations of communication device 800 are possible.

Example Clauses

Implementation examples are described in the following numbered clauses:

Clause 1: A method for wireless communications by a user equipment (UE), comprising: generating a sounding reference signal (SRS) using an SRS deep neural network (DNNs); transmitting, to a network entity, the generated SRS in one or more resource elements (REs); receiving, from the network entity, information identifying a precoding matrix to use for uplink transmissions on a shared channel; precoding uplink transmissions based on the identified precoding matrix; and transmitting, to the network entity, the precoded uplink transmissions on the shared channel.

Clause 2: The method of Clause 1, wherein parameters of the SRS DNN comprise a set of weights and biases defined in a wireless communication standard.

Clause 3: The method of any one of Clauses 1 or 2, further comprising receiving, from the network entity, configuration information identifying parameters of the SRS DNN.

Clause 4: The method of Clause 3, wherein: the configuration information identifying parameters of the SRS DNNs comprises an index in a lookup table, and the index in the lookup table is mapped to a set of bias and weight parameters for the SRS DNN.

Clause 5: The method of Clause 3, wherein the configuration information includes values for one or more bias and weight parameters of the SRS DNN.

Clause 6: The method of any one of Clauses 1 through 5, wherein the generated SRS is transmitted on one or more statically defined resource elements.

Clause 7: The method of any one of Clauses 1 through 5, further comprising receiving, from the network entity, configuration information identifying the one or more REs.

Clause 8: The method of any one of Clauses 1 through 7, further comprising applying a code division multiplexing (CDM) cover code to the generated SRS prior to transmitting the generated SRS to the network entity.

Clause 9: The method of any one of Clauses 1 through 8, further comprising: receiving, from the network entity, a transmitted precoding matrix indicator (TPMI), based on the generated SRS, for use in precoding the uplink transmissions, wherein precoding the uplink transmissions comprises: applying a precoding to the uplink transmissions based, at least in part, on one or more precoding DNNs, given the TPMI as input.

Clause 10: The method of Clause 9, wherein parameters of the one or more precoding DNNs comprise a statically defined set of weights and biases.

Clause 11: The method of Clause 9, further comprising: receiving, from the network entity, configuration information identifying parameters of the one or more precoding DNNs.

Clause 12: The method of any one of Clauses 1 through 11, further comprising: receiving, from the network entity, a transmitted precoding matrix indicator (TPMI) for use in precoding uplink transmissions, wherein precoding the uplink transmissions comprises applying a precoding based on an association between the received TPMI and a precoding to apply to the uplink transmissions.

Clause 13: The method of Clause 12, further comprising receiving, from the network entity, configuration information identifying the association between the received TPMI and the precoding to apply to the uplink transmissions.

Clause 14: The method of Clause 13, wherein the configuration information identifying the association between the received TPMI and the precoding information comprises a probabilistic model configured to identify a precoding to apply to the uplink transmissions based on a probability distribution over a universe of precodings, given the received TPMI as input.

Clause 15: The method of Clause 12, wherein the association between the received TPMI and the precoding to apply to the uplink transmissions comprises a statically defined association.

Clause 16: A method for wireless communications by a network entity, comprising: receiving, from a user equipment (UE), a sounding reference signal (SRS) generated by an SRS deep neural network (DNN); identifying a precoding matrix based on a precoding matrix deep neural network and the received SRS; transmitting, to the UE, the information identifying the precoding matrix; and receiving, from the UE, uplink transmissions precoded using the identified precoding matrix.

Clause 17: The method of Clause 16, further comprising transmitting, to the UE, configuration information identifying parameters of the SRS DNN.

Clause 18: The method of Clause 17, wherein: the configuration information identifying parameters of the SRS DNN comprises an index in a lookup table, and the index in the lookup table is mapped to a set of bias and weight parameters for the SRS DNN.

Clause 19: The method of Clause 17, wherein the configuration information includes values for one or more bias and weight parameters of the SRS DNN.

Clause 20: The method of any one of Clauses 16 through 19, further comprising transmitting, to the UE, configuration information identifying one or more REs on which the SRS is to be received.

Clause 21: The method of any one of Clauses 16 through 20, further comprising transmitting, to the UE, a transmitted precoding matrix indicator (TPMI), based on the generated SRS, for use in precoding the uplink transmissions via one or more precoding DNNs.

Clause 22: The method of Clause 21, further comprising transmitting, to the UE, configuration information identifying parameters of the one or more precoding DNNs.

Clause 23: The method of Clause 21, further comprising transmitting, to the UE, configuration information identifying an association between a TPMI and a precoding to be applied to the uplink transmissions.

Clause 24: The method of Clause 23, wherein the configuration information identifying the association between the received TPMI and the precoding information comprises a probabilistic model configured to identify a precoding to apply to the uplink transmissions based on a probability distribution over a universe of precodings, given the received TPMI as input.

Clause 25: A processing system, comprising: a memory comprising computer-executable instructions; and one or more processors configured to execute the computer-executable instructions and cause the processing system to perform a method in accordance with any one of Clauses 1-24.

Clause 26: A processing system, comprising: means for performing a method in accordance with any one of Clauses 1-24.

Clause 27: A non-transitory computer-readable medium comprising computer-executable instructions that, when executed by one or more processors of a processing system, cause the processing system to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of sounding and transmission precoding matrix indication determination for uplink transmissions using machine learning models in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:
   generating a sounding reference signal (SRS) using an SRS deep neural network (DNNs);
   transmitting, to a network entity, the generated SRS in one or more resource elements (REs);
   receiving, from the network entity, information identifying a precoding matrix to use for uplink transmissions on a shared channel;
   precoding uplink transmissions based on the identified precoding matrix;
   transmitting, to the network entity, the precoded uplink transmissions on the shared channel; and
   receiving, from the network entity, a transmitted precoding matrix indicator (TPMI), based on the generated SRS, for use in precoding the uplink transmissions,
   wherein precoding the uplink transmissions comprises: applying a precoding to the uplink transmissions based, at least in part, on one or more precoding DNNs, given the TPMI as input.

2. The method of claim 1, wherein parameters of the SRS DNN comprise a set of weights and biases defined in a wireless communication standard.

3. The method of claim 1, further comprising receiving, from the network entity, configuration information identifying parameters of the SRS DNN.

4. The method of claim 3, wherein:
   the configuration information identifying parameters of the SRS DNNs comprises an index in a lookup table, and
   the index in the lookup table is mapped to a set of bias and weight parameters for the SRS DNN.

5. The method of claim 3, wherein the configuration information includes values for one or more bias and weight parameters of the SRS DNN.

6. The method of claim 1, wherein the generated SRS is transmitted on one or more statically defined resource elements.

7. The method of claim 1, further comprising receiving, from the network entity, configuration information identifying the one or more REs.

8. The method of claim 1, further comprising applying a code division multiplexing (CDM) cover code to the generated SRS prior to transmitting the generated SRS to the network entity.

9. The method of claim 1, wherein parameters of the one or more precoding DNNs comprise a statically defined set of weights and biases.

10. The method of claim 1, further comprising receiving, from the network entity, configuration information identifying parameters of the one or more precoding DNNs.

11. A method for wireless communications by a network entity, comprising:
    receiving, from a user equipment (UE), a sounding reference signal (SRS) generated by an SRS deep neural network (DNN);
    identifying a precoding matrix based on a precoding matrix deep neural network and the received SRS;
    transmitting, to the UE, the information identifying the precoding matrix;
    receiving, from the UE, uplink transmissions precoded using the identified precoding matrix; and transmitting, to the UE, a transmitted precoding matrix indicator (TPMI), based on the generated SRS, for use in precoding the uplink transmissions via one or more precoding DNNs.

12. The method of claim 11, further comprising transmitting, to the UE, configuration information identifying parameters of the SRS DNN.

13. The method of claim 12, wherein:
the configuration information identifying parameters of the SRS DNN comprises an index in a lookup table, and
the index in the lookup table is mapped to a set of bias and weight parameters for the SRS DNN.

14. The method of claim 12, wherein the configuration information includes values for one or more bias and weight parameters of the SRS DNN.

15. The method of claim 11, further comprising transmitting, to the UE, configuration information identifying one or more REs on which the SRS is to be received.

16. The method of claim 11, further comprising transmitting, to the UE, configuration information identifying parameters of the one or more precoding DNNs.

17. The method of claim 11, further comprising transmitting, to the UE, configuration information identifying an association between a TPMI and a precoding to be applied to the uplink transmissions.

18. The method of claim 11, wherein the configuration information identifying the association between the received TPMI and the precoding information comprises a probabilistic model configured to identify a precoding to apply to the uplink transmissions based on a probability distribution over a universe of precodings, given the received TPMI as input.

19. An apparatus for wireless communication at a user equipment (UE), comprising: at least one memory comprising computer-executable instructions; and one or more processors configured to execute the computer-executable instructions and cause the UE to:

generate a sounding reference signal (SRS) using an SRS deep neural network (DNNs);
transmitting, to a network entity, the generated SRS in one or more resource elements (REs);
receive, from the network entity, information identifying a precoding matrix to use for uplink transmissions on a shared channel;
precode uplink transmissions based on the identified precoding matrix;
transmit, to the network entity, the precoded uplink transmissions on the shared channel; and
receiving, from the network entity, a transmitted precoding matrix indicator (TPMI), based on the generated SRS, for use in precoding the uplink transmissions,
wherein precoding the uplink transmissions comprises: applying a precoding to the uplink transmissions based, at least in part, on one or more precoding DNNs, given the TPMI as input.

20. An apparatus for wireless communication at a network entity, comprising: at least one memory comprising computer-executable instructions; and one or more processors configured to execute the computer-executable instructions and cause the network entity to:
receive, from a user equipment (UE), a sounding reference signal (SRS) generated by an SRS deep neural network (DNN);
identify a precoding matrix based on a precoding matrix deep neural network and the received SRS;
transmit, to the UE, the information identifying the precoding matrix;
receive, from the UE, uplink transmissions precoded using the identified precoding matrix; and
transmitting, to the UE, a transmitted precoding matrix indicator (TPMI), based on the generated SRS, for use in precoding the uplink transmissions via one or more precoding DNNs.

* * * * *